(12) United States Patent
Urhbach et al.

(10) Patent No.: US 7,860,717 B2
(45) Date of Patent: Dec. 28, 2010

(54) SYSTEM AND METHOD FOR CUSTOMIZING SPEECH RECOGNITION INPUT AND OUTPUT

(75) Inventors: Amy J. Urhbach, Needham, MA (US);
Alan Frankel, Framingham, MA (US);
Jill Carrier, Dorchester, MA (US); Ana Santisteban, Somerville, MA (US);
William F. Cote, Carlisle, MA (US)

(73) Assignee: Dictaphone Corporation, Stratford, CT (US)

( * ) Notice: Subject to any disclaimer, the term of this patent is extended or adjusted under 35 U.S.C. 154(b) by 1038 days.

(21) Appl. No.: 10/951,291

(22) Filed: Sep. 27, 2004

(65) Prior Publication Data
US 2005/0114122 A1 May 26, 2005

Related U.S. Application Data

(60) Provisional application No. 60/506,763, filed on Sep. 30, 2003.

(51) Int. Cl.
*G10L 11/00* (2006.01)
*G10L 21/06* (2006.01)
(52) U.S. Cl. ............... 704/276; 704/270; 704/275
(58) Field of Classification Search ......... 704/270, 704/275–276
See application file for complete search history.

(56) References Cited

U.S. PATENT DOCUMENTS

| 4,477,698 A | 10/1984 | Szlam et al. |
| 4,965,763 A | 10/1990 | Zamora |
| 5,253,164 A | 10/1993 | Holloway et al. |
| 5,325,293 A | 6/1994 | Dorne |
| 5,327,341 A | 7/1994 | Whalen et al. |
| 5,392,209 A | 2/1995 | Eason et al. |
| 5,544,360 A | 8/1996 | Lewak et al. ............ 707/1 |
| 5,664,109 A | 9/1997 | Johnson et al. ............ 705/2 |
| 5,799,268 A | 8/1998 | Boguraev ............ 704/9 |
| 5,809,476 A | 9/1998 | Ryan |
| 5,832,450 A | 11/1998 | Myers et al. ............ 705/3 |
| 5,884,256 A * | 3/1999 | Bennett et al. ............ 704/235 |
| 5,970,457 A * | 10/1999 | Brant et al. ............ 704/275 |
| 5,970,463 A | 10/1999 | Cave et al. |
| 6,014,663 A | 1/2000 | Rivette et al. ............ 707/4 |
| 6,021,202 A | 2/2000 | Anderson et al. |

(Continued)

OTHER PUBLICATIONS

Speech Recognition and Healthcare Documentation: A Revolution in Progress, Nuance Dictaphone Healthcare Solutions. May 2002.*

(Continued)

*Primary Examiner*—David R Hudspeth
*Assistant Examiner*—Justin W Rider
(74) *Attorney, Agent, or Firm*—Wolf, Greenfield & Sacks, P.C.

(57) ABSTRACT

A system and method may be disclosed for facilitating the site-specific customization of automated speech recognition systems by providing a customization client for site-specific individuals to update and modify language model input files and post processor input files. In customizing the input files, the customization client may provide a graphical user interface for facilitating the inclusion of words specific to a particular site. The customization client may also be configured to provide the user with a series of formatting rules for controlling the appearance and format of a document transcribed by an automated speech recognition system.

17 Claims, 4 Drawing Sheets

U.S. PATENT DOCUMENTS

| | | | |
|---|---|---|---|
| 6,052,693 A | 4/2000 | Smith et al. | 707/104.1 |
| 6,055,494 A | 4/2000 | Friedman | 704/9 |
| 6,088,437 A | 7/2000 | Amick | |
| 6,173,266 B1* | 1/2001 | Marx et al. | 704/270 |
| 6,182,029 B1 | 1/2001 | Friedman | 704/9 |
| 6,192,112 B1 | 2/2001 | Rapaport et al. | |
| 6,292,771 B1 | 9/2001 | Haug et al. | |
| 6,347,329 B1 | 2/2002 | Evans | |
| 6,405,165 B1 | 6/2002 | Blum et al. | |
| 6,434,547 B1 | 8/2002 | Mishelevich et al. | |
| 6,438,533 B1 | 8/2002 | Spackman et al. | |
| 6,553,385 B2* | 4/2003 | Johnson et al. | 707/104.1 |
| 6,915,254 B1 | 7/2005 | Heinze et al. | 704/9 |
| 6,947,936 B1 | 9/2005 | Suermondt et al. | 707/7 |
| 7,124,144 B2 | 10/2006 | Christianson et al. | 707/102 |
| 2002/0007285 A1 | 1/2002 | Rappaport | 705/2 |
| 2002/0032564 A1* | 3/2002 | Ehsani et al. | 704/235 |
| 2002/0077819 A1* | 6/2002 | Girardo | 704/260 |
| 2002/0089470 A1* | 7/2002 | Raman et al. | 345/30 |
| 2002/0095313 A1 | 7/2002 | Haq | 705/2 |
| 2002/0143824 A1 | 10/2002 | Lee et al. | 707/523 |
| 2002/0169764 A1 | 11/2002 | Kincaid et al. | 707/3 |
| 2003/0046264 A1 | 3/2003 | Kauffman | 707/1 |
| 2003/0061201 A1 | 3/2003 | Grefenstette et al. | 707/3 |
| 2003/0115080 A1 | 6/2003 | Kasravi et al. | 705/1 |
| 2003/0208382 A1 | 11/2003 | Westfall | 705/3 |
| 2003/0233345 A1 | 12/2003 | Perisic et al. | 707/3 |
| 2004/0103075 A1 | 5/2004 | Kim et al. | 707/1 |
| 2004/0139400 A1 | 7/2004 | Allam et al. | 715/526 |
| 2004/0186746 A1 | 9/2004 | Angst et al. | 705/3 |
| 2004/0220895 A1 | 11/2004 | Carus et al. | |
| 2004/0243545 A1 | 12/2004 | Boone et al. | |
| 2004/0243551 A1 | 12/2004 | Boone et al. | |
| 2004/0243552 A1 | 12/2004 | Titemore et al. | |
| 2004/0243614 A1 | 12/2004 | Boone et al. | |
| 2005/0108010 A1 | 5/2005 | Frankel et al. | |
| 2005/0120020 A1 | 6/2005 | Carus et al. | |
| 2005/0120300 A1 | 6/2005 | Schwager et al. | |
| 2005/0144184 A1 | 6/2005 | Carus et al. | |

OTHER PUBLICATIONS

"Hardware Reference Manual," Release 3 for DOS, revised Jan. 1994, PIKA Technologies, Inc., Ontario, Canada, available at http://www.pikatechnologies.com/downloads/legacy/AVA%20B-Series%20Hardware%20Manual.pdf (last accessed Jul. 25, 2005).

"Customizing D/41 Call Analysis," date unknown, Intel Corp., Santa Clara, California, available at http://resource.intel.com/telecom/support/appnotes/custd41d.htm (last accessed Jul. 25, 2005).

U.S. Appl. No. 11/068,493, Carus, et al.

U.S. Appl. No. 10/953,471, Cote, et al.

U.S. Appl. No. 11/069,203, Cote, et al.

U.S. Appl. No. 11/007,626, Cote, et al.

U.S. Appl. No. 10/840,428, Carus, et al.

U.S. Appl. No. 10/951,281, Cote, et al.

F. Song et al., A Graphical Interface to a Semantic Medical Information System, *Journal of Foundations of Computing and Decision Sciences*, 22(2), 1997.

F. Song et al., A Cognitive Model for the Implementation of Medical Problem Lists, *Proceedings of the First Congress on Computational Medicine, Public Health and Biotechnology*, Austin, Texas, 1994.

F. Song et al., A Graphical Interface to a Semantic Medical Information System, *Karp-95 Proceedings of the Second International Symposium on Knowledge Acquisition*, Representation and Processing, pp. 107-109, 1995.

*Epic Web Training Manual*, pp. 1-33, 2002.

B. Hieb, Research Note, NLP Basics for Healthcare, Aug. 16, 2002.

C. Shalizi et al., Pattern Discovery in Time Series, Part I: Theory, Algorithm, Analysis, and Convergence, *Journal of Machine Leaning Research* ? (2002) ?-? Submitted Oct. 28, 2002; Published ?/2002.

C. Nevill-Manning et al., The Development of Holte's 1R Classifier, Department of Computer Science.

D. Cutting et al., A Practical Part-of-Speech Tagger, Xerox Palo Alto Research Center.

J. Zavrel et al., Recent Advances in Memory-Based Part-of-Speech Tagging, ILK/Computational Linguistics.

E. Brill, Some Advances in Transformation-Based Part of Speech Tagging, Spoken Language Systems Group.

J. Nivre, DAC723: Language Technology Finite State Morphology, Vaxjo University of Mathematics and Systems Engineering, p. 1/11.

M. Creutz, Morphology and Finite-State Transducers, Oct. 31, 2001, Chap 3, Jurafsky & Martin.

http://www.comp.lancs.ac.uk/computing/research/stemming/general/index.htm printed Jul. 19, 2004.

http://www.comp.lancs.ac.uk/computinq/research/stemming/general/stemmingerrors.htm printed Jul. 19, 2004.

http://www.comp.lancs.ac.uk/computing/research/stemming/general/performance.htm printed Jul. 19, 2004.

M. Lee et al., Cleansing Data for Mining and Warehousing, Lecture Notes in Computer Science vol. 1677 archive, *Proceedings of the 10th International Conference on Database and Expert Systems Applications*, pp. 751-760, Springer-Verlag, London, 1999.

C. Van Rijsbergen, *Information Retrieval*, $2^{nd}$ Ed., Ch. 5, Butterworths, London, 1979.

J. Day, Extracting Knowledge from Text Using Learning by Constraint Relaxation (LCR), CSI, www.csi-inc.com/CSI/pdf/jday_icim02.pdf.

W. Gale et al., Discrimination Decisions for 100,000-Dimensional Spaces, *Current Issues in Computational Linguistics*, pp. 429-450, Kluwer Academic Publishers, 1994.

W. Daelemans et al., TiMBL: Tilburg Memory Based Learner, version 5.0, Reference Guide, ILK *Research Group Technical Report Series* No. 04-02 (ILK-0402), ILK Research Group, Tilburg University, Tilburg, Netherlands, 2004.

Case Study: Massachusetts Medical Society http://www.microsoft.com/resources/casestudies/CaseStudy.asp?CaseStudyID=14931 posted Jan. 13, 2004.

W. Braithwaite, Continuity of Care Record (CCR) http://www.hl7.org/library/himss/2004Orlando/ContinuityofCareRecord.pdf.

C. Waegemann, EHR vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical System Interoperability, http://www.kryptig.com/News/PressReleases/27.html posted Feb. 17, 2004.

Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore Mar. 3, 2004.

Continuity of Care Record (CCR): The Concept Paper of the CCR, v. 2.1b, http://www.bhtinfo.com/CCR.Concept%20Paper.1.5.doc.

Continuity of Care Record, American Academy of Family Physicians, http://www.aafp.org/x24962.xml?printxml posted Nov. 12, 2003.

Continuity of Care Record (CCR), AAFP Center for Health Information Technology, http://www.centerforhit.org/x201.xml posted Aug. 20, 2004.

Core Measures web page, Joint Commission on Accreditation of Healthcare Organizations, http://www.jcaho.org/pms/core+measures/ printed Mar. 22, 2004.

*Specifications Manual for National Implementation of Hospital Core Measures*, v. 2.0, Joint Commission on Accreditation of Healthcare Organizations, http://www.jcaho.org/pms/core+measures/information+on+final+specifications.htm.

Code Information and Education web page, American Medical Association, http://www.ama-assn.org/ama/pub/category/3884.html printed Mar. 22, 2004.

Category III CPT Codes, American Medical Association, http://www.ama-assn.org/ama/pub/article/3885-4897.html printed Mar. 22, 2004.

ICD-9-CM Preface (FY04), http://ftp.cdc.gov/pub/Health_Statistics/NCHS/Publications/ICD9-CM/2004/Prefac05.RTF.

*ICD-9-CM Official Guidelines For Coding and Reporting*, effective Oct. 1, 2003.

Q. X. Yang et al., "Faster algorithm of string comparison," *Pattern Analysis and Applications*, vol. 6, No. 1, Apr. 2003: pp. 122-133.

* cited by examiner

SYSTEM AND METHOD FOR CUSTOMIZING SPEECH RECOGNITION INPUT AND OUTPUT

CROSS-REFERENCE TO RELATED APPLICATIONS

This application claims the benefit of priority of U.S. Provisional Patent Application No. 60/506,763, entitled "SYSTEM AND METHOD FOR CUSTOMIZING SPEECH RECOGNITION INPUT AND OUTPUT," filed Sep. 30, 2003, which is hereby incorporated by reference in its entirety.

This application relates to co-pending U.S. patent application Ser. No. 10/447,290, entitled "SYSTEM AND METHODS UTILIZING NATURAL LANGUAGE PATIENT RECORDS," filed on May 29, 2003; co-pending U.S. patent application Ser. No. 10/413,405, entitled "SYSTEMS AND METHODS FOR CODING INFORMATION," filed Apr. 15, 2003; co-pending U.S. patent application Ser. No. 11/068,493, entitled "A SYSTEM AND METHOD FOR NORMALIZATION OF A STRING OF WORDS," filed on Feb. 28, 2005; co-pending U.S. patent application Ser. No. 10/448,320, entitled "METHOD, SYSTEM, AND APPARATUS FOR DATA REUSE," filed on May 30, 2003; co-pending U.S. patent application Ser. No. 10/787,889, entitled "SYSTEM, METHOD AND APPARATUS FOR PREDICTION USING MINIMAL AFFIX PATTERNS," filed on Feb. 27, 2004; co-pending U.S. patent application Ser. No. 10/448,317, entitled "METHOD, SYSTEM, AND APPARATUS FOR VALIDATION," filed on May 30, 2003; co-pending U.S. patent application Ser. No. 10/448,325, entitled "METHOD, SYSTEM, AND APPARATUS FOR VIEWING DATA," filed on May 30, 2003; co-pending U.S. patent application Ser. No. 10/953,448, entitled "SYSTEM AND METHOD FOR DOCUMENT SECTION SEGMENTATIONS," filed on Sep. 30, 2004; co-pending U.S. patent application Ser. No. 10/953,471, entitled "SYSTEM AND METHOD FOR MODIFYING A LANGUAGE MODEL AND POST-PROCESSOR INFORMATION," filed on Sep. 29, 2004; co-pending U.S. patent application Ser. No. 10/953,474, entitled "SYSTEM AND METHOD FOR POST PROCESSING SPEECH RECOGNITION OUTPUT," filed on Sep. 29, 2004; co-pending U.S. patent application Ser. No. 10/951,281, entitled "METHOD, SYSTEM AND APPARATUS FOR REPAIRING AUDIO RECORDINGS," filed on Sep. 27, 2004; co-pending U.S. patent application Ser. No. 11/069,203, entitled "SYSTEM AND METHOD FOR GENERATING A PHASE PRONUNCIATION," filed on Feb. 28, 2005; co-pending U.S. patent application Ser. No. 11/007,626, entitled "SYSTEM AND METHOD FOR ACCENTED MODIFICATION OF A LANGUAGE MODEL," filed on Dec. 7, 2004; co-pending U.S. patent application Ser. No. 10/948,625, entitled "METHOD, SYSTEM, AND APPARATUS FOR ASSEMBLY, TRANSPORT AND DISPLAY OF CLINICAL DATA," filed on Sep. 23, 2004; and co-pending U.S. patent application Ser. No. 10/840,428, entitled "CATEGORIZATION OF INFORMATION USING NATURAL LANGUAGE PROCESSING AND PREDEFINED TEMPLATES," filed on Sep. 23, 2004, all of which are hereby incorporated by reference in their entirety.

BACKGROUND OF THE INVENTION

Speech recognition systems have become important tools in certain work environments. In particular, environments with considerable amounts of dictation and transcription, as in the medical and legal professions, benefit from the speed and cost savings of speech recognition software and advancements. However, speech recognition engines are often generic and not initially customized for specific work environments.

Often, the speech recognition engine employed by a company or institution does not fully address the requirements of the working environment. For example, a medical facility needs a speech recognition system capable of identifying and transcribing the names of the doctors at the site, words not typically included in the general speech recognition input files.

Also, documents generated by a speech recognition engine are not always consistent with a desired format. For example, physicians may dictate dates in many ways and a general speech recognition engine transcribes the dictation verbatim. However, the medical facility's document management system requires the date in a particular standardized date format.

Conventionally, specialized administrators or human speech recognition agents have customized the speech recognition input files for a particular site. These input files control the number and types of words that the speech recognition engine recognizes and transcribes. These input files also control the format and appearance of the output or text file from the speech recognition engine.

Unfortunately, the conventional approach to modifying input files and customizing the speech recognition engine for a particular site, like a hospital, is a time-intensive and expensive process. The special administrator updates the input files by including specific new words one at a time. Furthermore, the special administrator usually has no expertise in the words being added to customize the speech recognition engine. For example, when customizing a speech recognition engine for a hospital, the special administrator's expertise is in computer programming and not in prescription drugs. Conversely, while choosing hospital personnel familiar with medical terms and hospital jargon could rectify this, conventional systems do not facilitate this process for personnel without computer programming expertise.

SUMMARY OF THE INVENTION

The present invention includes an embodiment that relates to customizing the input and output of a speech recognition engine. In particular, site-specific customization may facilitate automated speech recognition systems by providing a customization client for site-specific individuals to update and modify language model input files and post processor input files. The method may include collecting data having a predetermined format. The method may also include formatting the data into flat files or compiling the data into files suitable for importation into the customization client. The method may include normalizing the data and a filtering step to organize the data in preparation for display of the data to the user.

The method may further include actually displaying the data for user review. During review by the user, the data may be filtered and normalized according to user preferences to better present the data in the customization client. The method includes categorizing the data according to user-specified rules. The user may also specify the format and appearance of the final report according to user-specified rules. The customization client may also prompt the user to specify the amount of logging information to record for technical purposes.

The method may also include outputting categorized data or word list files for modifying a language model used by an automated speech recognition system. The method may include exporting categorized data or word list files as formatting data to the post processor for use in formatting a final report. The method may also include outputting a delta file to the post processor instructing the post processor of the user-specified rules for formatting and appearance of a final report.

The above features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF THE DRAWINGS

While the specification concludes with claims particularly pointing out and distinctly claiming the present invention, it may be believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE EMBODIMENTS

Figure 1:
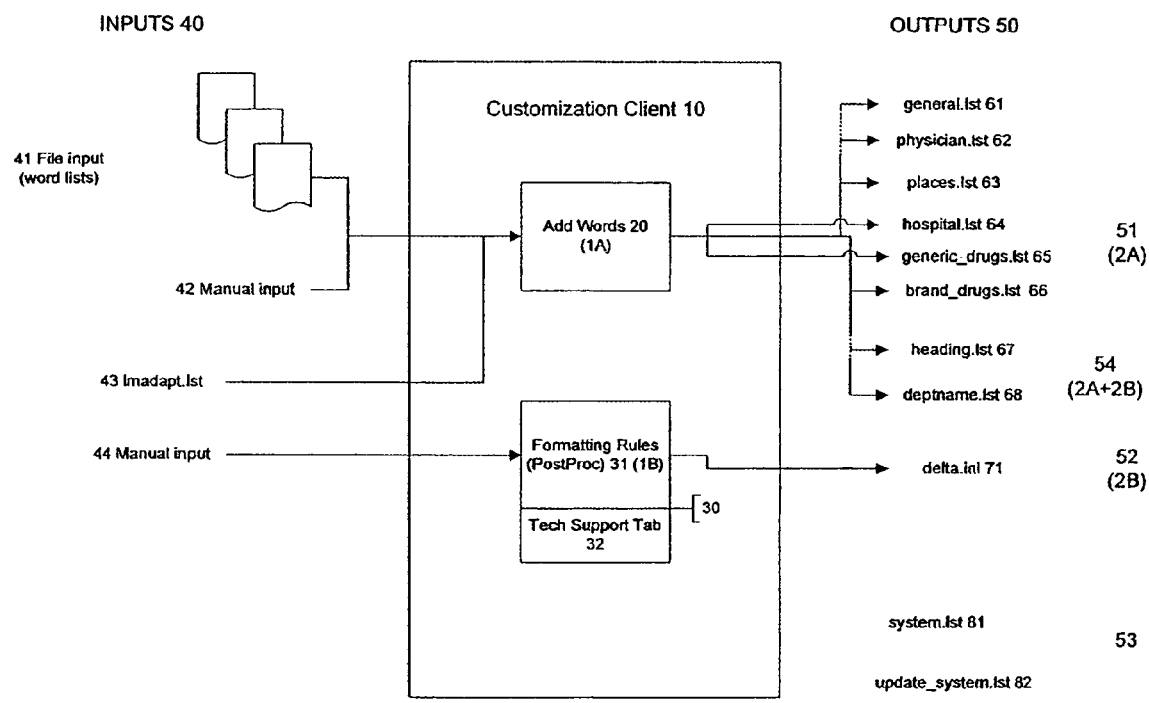
FIG. 1 illustrates an exemplary architecture of a customization client in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present invention relate to customizing the input and output of a speech recognition engine. In particular, site-specific customization may facilitate automated speech recognition systems by providing a customization client for site personnel to update and modify language model input files and post processor input files. The customization may also be applied to customize a speech recognition engine and post processor for a small group or an individual.

The automated speech recognition system may include a speech recognition phase and a post processor phase. During the speech recognition phase, a speech recognition engine turns voice data into corresponding text data using language models. During the post processor phase, a post processor formats the unformatted result of the speech recognition phase using site-specific user-specified rules.

The customization client may be configured to provide a user at a site with two graphic user interfaces (GUI): an add words interface and a formatting rules interface. The add words interface may be used to add words and/or phrases to the various lists of words and generate or modify the language model used by a speech recognition engine to transcribe a dictated or voice file into an unformatted text file. The formatting rules interface may allow a user to specify formatting rules used by a post processor to format the unformatted text file generated by the speech recognition engine.

The graphic user interfaces may provide a user at a site with all the tools necessary to customize the language model inputs and the post processor inputs without having any previous computer programming experience. The customization client may only require the user to be knowledgeable about the specifics of the data being entered for customization. For example, if the customization client is being implemented at a hospital for automatic transcription of dictated medical reports, the user should be knowledgeable about the hospital and medical terms.

The customization client may also be configured to receive data for use in customizing the input files. The entry of words or data into the customization client may be automated or manual. Lists of words, names, number or other characters and combinations may be entered in the customization client in an automated fashion by importing the entire list at one time. Individual words, phrases, or other data can be entered in the customization client one at a time as well. The customization client may have GUIs guiding the user through the importation of list entries and individual entries.

The customization client may also be configured to provide graphic user interfaces for guiding a user through customization. The customization client may normalize the entered data and display the data in a GUI for review by the site-specific user. The customization client may also present the data such that the user may categorize the entries into specific categories using preprogrammed category buttons. For example, the category buttons could provide options to divide words into categories such as headings, department names, doctor names, and brand medications.

The customization client may be configured to generate word list files categorized by the user. The language model input files may be made up of the word list files from the customization client. These word list files may include all words from previous word lists and any new words entered into the customization client since the word list files were last generated.

The customization client may be further configured to provide formatting rules to the post processor. The formatting rules may be presented to the user at the site as GUIs and may prompt the user to select formatting rules for subjects such as punctuation and capitalization. The user may customize the formatting rules by choosing from predetermined answer options. From these answers, the customization client may create an input file or delta file to be used by the post processor. For example, the customization client may ask the user for the desired style for formatting dates. The post processor may then format the dates present in the output from the speech recognition engine such that the resultant document from the post processor meets the user's expectations.

The customization client may also be configured to provide user-defined formatting rules that apply to words and phrases in a particular category. The customization client may ask the user how the words in a specific list should be formatted in the resultant document. According to the answers of the site user, the post processor input may contain formatting rules for how the words found in specific word lists should be formatted.

For example, the user may indicate that the headings in the document should be all capitals and should be preceded and followed by blank lines in the resultant document. The post processor may then match the words in the headings word list file with words in the unformatted text file from the speech recognition engine and format the matched words according to the formatting rules specified by the user in the customization client.

The customization client may also be configured to record technical support data for both the speech recognition engine and the post processor. The customization client may provide a GUI of options for how much data, how often, and which specific kinds of data to record. A technical specialist may use the data to identify deficiencies and troubleshoot problems. Data to be recorded may include the number and percentage of correctly or incorrectly transcribed words by the speech recognition engine, or the amount of post processing required, or failed post processing attempts.

The customization may save valuable time in the dictation and transcription process by quickly customizing a generic speech recognition engine to recognize words specifically associated with a particular site. An additional benefit of the present invention is that transcriptions will likely be more complete, as the customized speech recognition engine will transcribe more of the dictated words. The customized speech recognition engine may also provide more accurate transcriptions due to the fact that a user at that site performs the customization rather than a computer programmer who is not familiar with the particular site.

The customization may also save valuable time and effort by providing better and more customized automatic post processing. The results of customized post processing may in fact require less intensive editing and review by transcriptionists. The correctly formatted text files may also conform to the specific requirements of a particular site and therefore more efficiently and accurately work within a site's document management system.

FIG. 1 illustrates an exemplary architecture of a customization client 10 in accordance with an embodiment. It should be readily apparent to those of ordinary skill in the art that the exemplary architecture depicted in FIG. 1 represents a generalized schematic illustration and that other components may be added or existing components may be removed or modified.

As shown in FIG. 1, the customization client 10 includes an add words interface 20, a formatting rules interface 31, and a technical support interface 32. The customization client 10 may be configured to receive inputs 40 and produce outputs 50. The customization client 10 may be configured to use GUIs to receive the inputs 40, process the inputs according to the customization requirements of a particular site, and export outputs 50.

The customization client 10 may be configured to present the inputs 40 in a manner that enables a user at a site to quickly perform functions on inputs 40. Specifically, the customization client 10 may consist of a series of screens where a user may be presented with a series of radio buttons and other options for making decisions about inputs 40.

Inputs 40 are shown in FIG. 1 and may include word list inputs 41, manual word inputs 42, language model adaptation file 43, and manual input 44. The first three inputs may be specifically for the add words interface. The word list inputs 41 may be lists of words compiled into files, which may be entered into the customization client 10 using import wizards. The client user may enter the manual word inputs 42 on an individual basis. Finally, the language model adaptation file 43 may be a file created by a human transcriptionist or by an automatic process, and includes a list of words used by the doctors or dictators that were not recognized by the system but were corrected by the transcriptionist during review. The manual input 44 may be configured to manually select and process the formatting rules interface 31 in order to select the appropriate formatting rules for the post processor.

Once the words have been inputted into the add words interface 20, the words may be normalized, spell-checked, and/or undergo other functions to prepare the words for display to the user in the add words interface 20. The add words interface 20 may present the words for categorization into predetermined categories. The user may select a displayed word and then select a word list to categorize the word. Once some or all of the words are categorized, the word list(s) may be generated by the add words interface 20 in the form of outputs 50. The word list(s) generated may be general list 61, physician list 62, places list 63, hospital list 64, generic drug list 65, brand drug list 66, heading list 67, and department name list 68. The predetermined categories of the add words interface 20 may correspond to the out put word lists 61-68. The customized data may be considered to be made up of the combination the word lists 61-68. The language model may then be considered to be made up of the combination the word lists 61-68 together with a factory language model.

If words are misspelled in the displayed words of the add words interface 20, the user may elect to place the misspelled words in a rejected list. Words in the rejected list may be suppressed from the word lists presented to the speech recognition engine. The rejected list may also be maintained and used to screen input words so that the user does not have to continuously reject the same misspelled words over and over.

The user may elect to place words in an ignore list for further investigation and/or future disposition. Words in the ignore list may be suppressed from the word lists presented to the speech recognition engine. The ignore list may also be maintained and used to screen input words so that the user does not have to continuously process or ignore the same words over and over.

The formatting rules interface 31 may provide the user at the site with optional preferences for the formatted text file after automatic speech recognition and post processing has taken place. The formatting rules interface 31 more specifically may present the user with a series of formatting questions requiring manual input 44 to answer according to user preferences. The answers may be used to generate the formatting rules and the output delta file 71. The post processor may use the delta file 71 to implement the user-specified formatting rules.

The last option of the customization client 10 may be the technical support interface 32. The technical support interface 32 requires manual input 44 to answer questions and select preferences similar to the formatting rules interface 31. The output of the technical support interface 32 may be the output delta file 71. The post processor may use the delta file 71 to select the level of logging information.

The customization client 10 may also be configured to pass along two additional word lists: system list 81 and update system list 82. The system list 81 may be issued only once to upgrade the customization client 10 from a previous release of the system. The update system list 82 may be replaced periodically to incorporate corrections and additions to the language models. Both the system list 81 and the update system list 82 may be part of the customization process, but they are not visible in the customization client for modification by the user. They are tools for transparently delivering updates to users by the language model developers.

The customization client 10 may be implemented as a software program, a utility, a subroutine, or other similar programming entity. In this respect, the customization client 10 may be implemented using software languages such as C, C++, Java, etc. Alternatively, the customization client 10 may be implemented as an electronic device utilizing an application-specific integrated circuit, discrete components, solid-state components or a combination thereof.

Figure 2:
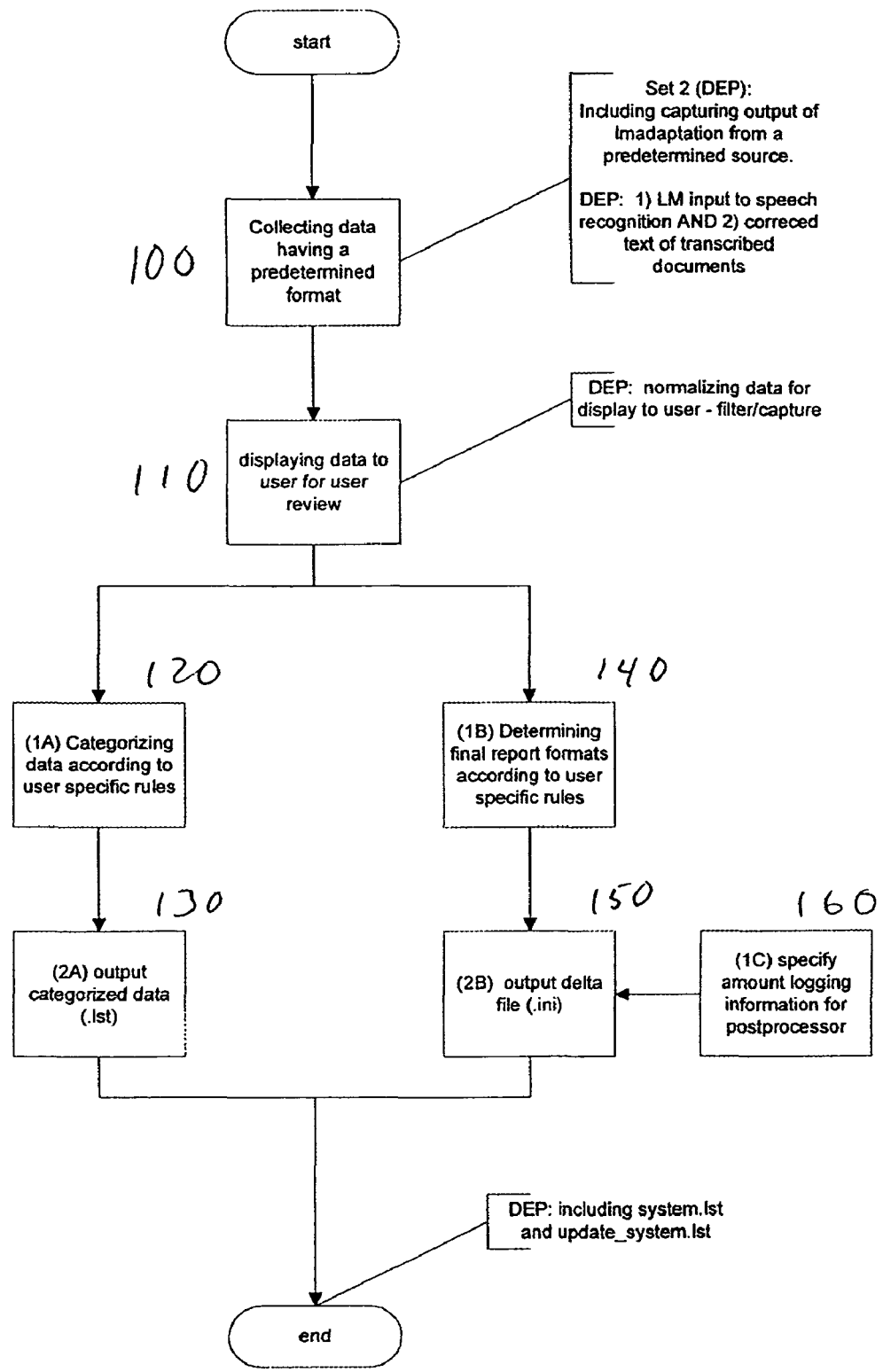
FIG. 2 illustrates an exemplary flow diagram for the customization in accordance with an embodiment.

FIG. 2 illustrates an exemplary flow diagram for the customization client 10 in accordance with an embodiment. It should be readily apparent to those of ordinary skill in the art that this flow diagram represents a generalized illustration and that other steps may be added or existing steps may be removed or modified.

As shown in FIG. 2, the customization client 10 can be represented as steps in a flow diagram. The step 100 may include collecting data having a predetermined format. The step 100 corresponds to the inputs 41-43 of FIG. 1. The step 110 may include the process of normalizing the data and preparing the data for presentation in the add words interface 20. An example of the step 110 might include highlighting misspelled words for possible rejection by the user.

The steps 120 and 130 correspond to the add words interface 20. Step 120 may include the user categorizing the words from the step 100 into the predetermined categories. Once the user has categorized the words, step 130 may generate the output word list files. The step 130 may generate the output files 61-68 according to FIG. 1.

The steps 140 and 150 correspond to the formatting rules interface 31. Step 140 may include the user supplying the manual inputs 44 such that the formatting rules may be determined. The manual inputs 44 determine the user-preferred formatting rules and the step 150 generates the delta file 71. The delta file 71 may then be delivered to the post processor.

Additionally, the technical support interface 32 is shown in FIG. 2 as step 160. Step 160 includes manual inputs 44 specifying the amount of logging or recording of information for technical purposes. Step 160 feeds those user choices into step 150 where they are incorporated into the delta file 71, which is generated and delivered to the post processor for data recording.

Figure 3:
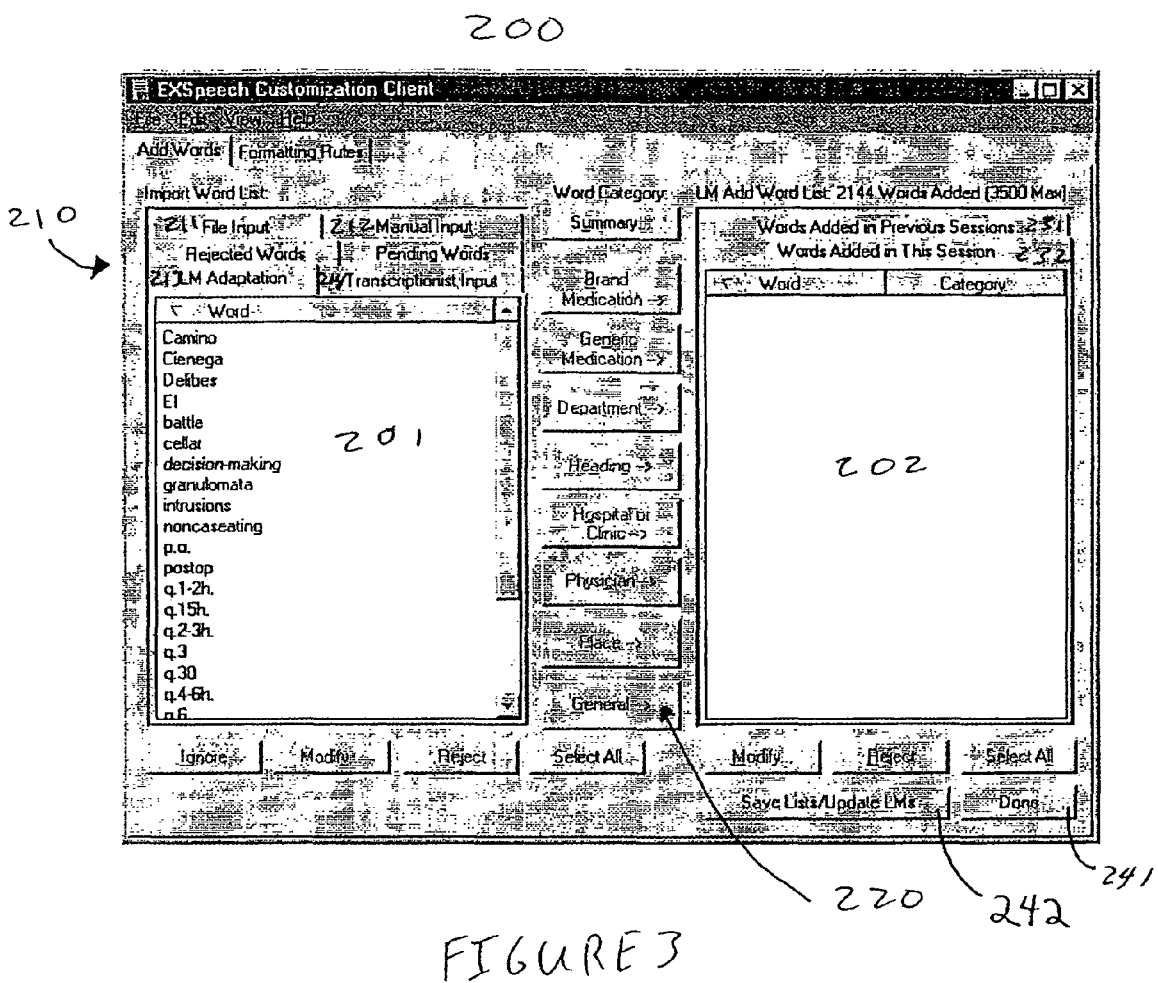
FIG. 3 illustrates an add words GUI provided by the customization client in accordance with an embodiment.

FIG. 3 illustrates an add words interface GUI 200 provided by the customization client 10 in accordance with an embodiment. It should be readily apparent that the elements of the add words interface GUI 200 may be deleted and/or modified and new elements added.

As shown in FIG. 3, the add words interface GUI 200 may include an import list 201 in a left column and a language model word list 202 in a right column. Located atop the import word list 201 may be tabs or buttons 210. Buttons 210 may be configured to offer the user the various methods of word input 41-43 according to FIG. 1. The file input tab 211 may allow the user to input words compiled into files according to word list input 41. The manual input tab 212 may allow the user to input words manually according to the manual input 42 of FIG. 1. The language model adaptation tab 213 and the transcriptionist input tab 214 might include words that have been identified for addition to the language model during a transcriptionist review or automated review of missed words.

The language model add word list 202 may be configured to offer the user different ways of viewing added words. The words added in previous sessions tab 231 and the words added in this session tab 232 may offer the user the ability to view all words that have been entered in the previous sessions under one option and under another option may present all words added in the present customization client session.

The list of buttons 220 may be located between the import word list 201 and the language model add word list 202 and may also correspond to the word lists generated by the add words interface 20 according to FIG. 1. Each button in the list of buttons 220 may correspond to one of the word list files 61-68 as shown in FIG. 1. The add words interface GUI 200 may be configured to categorize the words in the import word list 201 into the categories listed in the list of buttons 220. The user may select a word in the import word list 201 and then select a category from the list of buttons 220. Once a category has been assigned, the word may appear in the language model add word list 202 with a designated category.

The add words interface GUI 200 may also be configured to select multiple words at a time and categorize the selected words from the import word list 201 by selecting a category from the list of buttons 220. The add words interface GUI 200 may be configured to save the word lists and update the language models using save lists/update language model button 242. When finished, the add words interface GUI 200 may be configured to provide the user with a done button 241. Button 241 may be configured to take the words and their corresponding categories in the language model add word list 202 and generate the word list files 61-68 according to the categories in the list of buttons 220.

Figure 4:
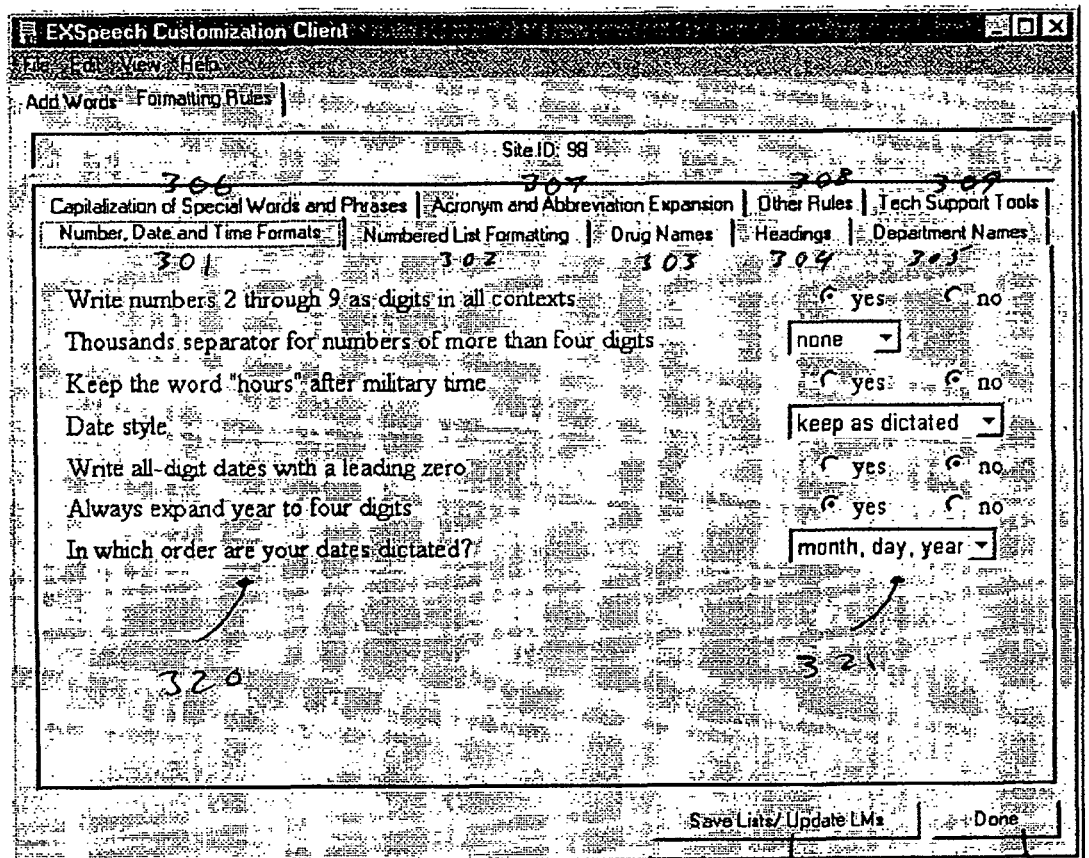
FIG. 4 illustrates a formatting rules GUI provided by the customization client in accordance with an embodiment.

FIG. 4 illustrates a formatting rules interface GUI 300 provided by the customization client 10 in accordance with an embodiment. It should be readily apparent that the elements of the formatting rules interface GUI 300 may be deleted and/or modified and new elements added.

As shown in FIG. 4, the formatting rules interface GUI 300 may be configured to present the user with formatting categories. The formatting categories may include the number, date and time formats 301, numbered list formatting 302, drug names 303, headings 304, department names 305, capitalization of special words and phrases 306, acronym and abbreviation expansion 307, other rules 308, and technical support tools 309.

Each of the formatting categories 301-309 may be configured to present the user with a set of questions 320 and a set of answer options 321. The example used in FIG. 4 illustrates that radio buttons and/or drop down lists may be used by the formatting rules interface GUI 300. One of ordinary skill in the art would understand that other programming techniques might be employed for the sets of questions 320 and the sets of answer options 321.

Answering the sets of questions 320 and selecting answers from the set of answers 321 may define the formatting rules according to the user's preferences. For example, the formatting rule concerning thousands separators for numbers greater than four digits may be defined by the user selecting an answer from the drop down menu shown in FIG. 4. This formatting rule may be included with the other rules and from tabs 301-309 to create the set of formatting rules that may be provided to the post processor.

The formatting rules interface GUI 300 may also be configured to save the lists or update the language models or formatting rules by selecting the save lists/update language model button 242. The done button 241 may also be used to generate the delta file 71 and provide the delta file 71 to the post processor.

The technical support tab 309 may be configured to define the amount and type of information recorded through sets of questions 320 and sets of answers 321. The results of the technical support tab 309 may be included in the delta file 71 and may instruct the post processor to record data according to the rules defined in the technical support tab.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer-readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, may be a computer readable medium. The same may be true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Further undescribed alternative embodiments are possible. It will be appreciated that many of those undescribed embodiments are within the literal scope of the following claims, and others are equivalent.

What is claimed is:

1. A method for customizing input data for a language model in a speech recognition system, the language model having a predetermined data format for receiving words and/or phrases to be added to the language model, the method comprising:
   providing a graphical user interface (GUI) that allows a user to specify a plurality of words and/or phrases in a first format independent of the predetermined data format of the language model; and
   automatically converting the specified plurality of words and/or phrases in the first format, via at least one computer system, to language model input data in a second format compatible with the predetermined data format of the language model.

2. The method according to claim 1, wherein providing the GUI comprises formatting the plurality of words and/or phrases into flat files.

3. The method according to claim 1, wherein the automatically converting the specified plurality of words and/or phrases comprises normalizing the specified plurality of words and/or phrases for use by the language model.

4. The method according to claim 1, wherein the automatically converting the specified plurality of words and/or phrases comprises filtering the specified plurality of words and/or phrases for use by the language model.

5. The method according to claim 1, wherein providing the GUI comprises displaying words and/or phrases for possible selection by the user via the GUI.

6. The method according to claim 5, wherein the displaying the words and/or phrases comprises normalizing the words and/or phrases for display to the user.

7. The method according to claim 5, wherein the displaying the words and/or phrases comprises filtering the words and/or phrases for display to the user.

8. The method according to claim 1, wherein providing the GUI comprises importing words and/or phrases for possible selection by the user via the GUI.

9. The method according to claim 1, wherein providing the GUI comprises providing buttons representing predetermined options for the user to select via the GUI.

10. The method according to claim 1, further comprising adding the specified plurality of words and/or phrases to the language model using the language model input data in the second format.

11. A method for customizing input data for a post processor in a speech recognition system, the post processor having a predetermined data format for receiving formatting rules to be used in formatting text documents, the method comprising:
   providing a graphical user interface (GUI) that allows a user to specify formatting rules in a first format independent of the predetermined data format of the post processor; and
   automatically converting the specified formatting rules in the first format, via at least one computer system, to post processor input data in a second format compatible with the predetermined data format of the post processor.

12. The method according to claim 11, wherein providing the GUI comprises providing buttons representing predetermined options for the user to select via the GUI.

13. The method according to claim 11, further comprising configuring the post processor to format text documents in accordance with the specified formatting rules using the post processor input data in the second format.

14. A system for customizing input data for a language model in a speech recognition system, the language model having a predetermined data format for receiving words and/or phrases to be added to the language model, the system comprising at least one computer system configured to:
   provide a graphical user interface (GUI) that allows a user to specify a plurality of words and/or phrases in a first format independent of the predetermined data format of the language model; and
   automatically convert the specified plurality of words and/or phrases in the first format to language model input data in a second format compatible with the predetermined data format of the language model.

15. At least one computer-readable storage medium encoded with a plurality of computer-executable instructions that, when executed, perform a method for customizing input data for a language model in a speech recognition system, the language model having a predetermined data format for receiving words and/or phrases to be added to the language model, the method comprising:
   providing a graphical user interface (GUI) that allows a user to specify a plurality of words and/or phrases in a first format independent of the predetermined data format of the language model; and automatically converting the specified plurality of words and/or phrases in the first format to language model input data in a second format compatible with the predetermined data format of the language model.

16. A system for customizing input data for a post processor in a speech recognition system, the post processor having a predetermined data format for receiving formatting rules to be used in formatting text documents, the system comprising at least one computer system configured to:
 provide a graphical user interface (GUI) that allows a user to specify formatting rules in a first format independent of the predetermined data format of the post processor; and
 automatically convert the specified formatting rules in the first format to post processor input data in a second format compatible with the predetermined data format of the post processor.

17. At least one computer-readable storage medium encoded with a plurality of computer-executable instructions that, when executed, perform a method for customizing input data for a post processor in a speech recognition system, the post processor having a predetermined data format for receiving formatting rules to be used in formatting text documents, the method comprising:
 providing a graphical user interface (GUI) that allows a user to specify formatting rules in a first format independent of the predetermined data format of the post processor; and
 automatically converting the specified formatting rules in the first format to post processor input data in a second format compatible with the predetermined data format of the post processor.

* * * * *

UNITED STATES PATENT AND TRADEMARK OFFICE
CERTIFICATE OF CORRECTION

PATENT NO. : 7,860,717 B2
APPLICATION NO. : 10/951291
DATED : December 28, 2010
INVENTOR(S) : Amy J. Uhrbach et al.

It is certified that error appears in the above-identified patent and that said Letters Patent is hereby corrected as shown below:

On the Title Page, item [75] Inventors should read:
(75) Inventors: Amy J. Uhrbach, Needham, MA (US);
Alan Frankel, Framingham, MA (US);
Jill Carrier, Dorchester, MA (US);
Ana Santisteban, Somerville, MA (US);
William F. Cote, Carlisle, MA (US)

Signed and Sealed this
Seventh Day of June, 2011

David J. Kappos
*Director of the United States Patent and Trademark Office*